(12) United States Patent
Derivaz

(10) Patent No.: US 11,666,064 B2
(45) Date of Patent: Jun. 6, 2023

(54) APPARATUS, METHOD FOR MAKING A PASTRY IN THE SHAPE OF A CONE, AND SAID PASTRY

(71) Applicant: SAMVAZ SA, Châtel-St-Denis (CH)

(72) Inventor: François Derivaz, Châtel-St-Denis (CH)

(73) Assignee: SAMVAZ SA, Châtel-St-Denis (CH)

( * ) Notice: Subject to any disclaimer, the term of this patent is extended or adjusted under 35 U.S.C. 154(b) by 568 days.

(21) Appl. No.: 16/818,468

(22) Filed: Mar. 13, 2020

(65) Prior Publication Data

US 2020/0288744 A1 Sep. 17, 2020

(30) Foreign Application Priority Data

Mar. 13, 2019 (CH) ...................... 00305/19

(51) Int. Cl.
*A23G 3/34* (2006.01)
*A23G 3/50* (2006.01)

(52) U.S. Cl.
CPC ............. *A23G 3/0029* (2013.01); *A23G 3/50* (2013.01)

(58) Field of Classification Search
None
See application file for complete search history.

(56) References Cited

U.S. PATENT DOCUMENTS

| 1,190,134 A | 7/1916 | Embrey |
| 2015/0201625 A1 | 7/2015 | Goldstein et al. |

FOREIGN PATENT DOCUMENTS

| FR | 2 976 922 A3 | 12/2012 |
| TW | M 543 563 U | 6/2017 |

OTHER PUBLICATIONS

International Search Report issued in Swiss Patent Application No. CH 3052019 dated Jun. 18, 2019 with partial English translation provided.
European Search Report issued in European Patent Application No. 20 16 1009 dated Jun. 12, 2020 with partial English translation provided.

*Primary Examiner* — Jyoti Chawla
(74) *Attorney, Agent, or Firm* — Nixon & Vanderhye

(57) ABSTRACT

Disclosed is an apparatus for making a pastry in the shape of a cone, including a base carrying a plate, a cone holder removably mounted on the plate, at least one conical mold removably mounted on the cone holder, and a guide to guide a tool for depositing a preparation intended forming the pastry. The guide and cone holder are arranged so the depositing tool and the conical mold move with respect to each other to deposit, on the mold, the preparation to become the pastry to obtain at least one cone of the preparation formed around the conical mold. Also disclosed are equipment including the apparatus and the depositing tool, a method for making a pastry in the shape of a cone from a preparation intended to become the pastry by using the apparatus or the equipment, as well as the pastry in the shape of a cone.

15 Claims, 12 Drawing Sheets

APPARATUS, METHOD FOR MAKING A PASTRY IN THE SHAPE OF A CONE, AND SAID PASTRY

BACKGROUND OF THE INVENTION

Field of the Invention

The present invention relates to an apparatus for making a pastry in the shape of a cone. The present invention likewise relates to equipment, to a method for making a pastry in the shape of a cone by using said apparatus, as well as to said pastry obtained in accordance with said method and made of meringue.

Description of the Related Art

A pastry in the shape of a cone is a preparation of a savoury or sweet mixture baked in the oven, generally used as an edible holder to make ice-creams or different dishes in which the cone of baked mixture is filled with savoury or sweet preparations.

The cones can be made of puff pastry or shortcrust pastry, for example. The puff pastry or shortcrust pastry is rolled out, cut in the shape of a thin strip and then wound around a conical metal mould, generally made of stainless steel. The pastry wound around the mould is baked in the oven and then the baked pastry cone is removed from the mould. This method can only be used to make cones from a pastry which can be rolled out and cut to form thin strips.

The cones can likewise be made from a thin wafer previously baked in the shape of a disc, then—immediately after baking—wound around a conical mould allowing the wafer to take the shape of a cone before cooling. This method can only be used to make cones from wafer discs. Furthermore, it requires a certain amount of dexterity to be able to quickly and properly form the cones.

None of the current known methods allows a pastry to be formed in the shape of a cone from a preparation intended to become the pastry which, when unbaked, has certain rheological properties allowing it, in particular, to be extruded and which, once baked, has a certain amount of rigidity preventing any subsequent shaping. Thus, for example, when the pastry is a meringue cone, the preparation intended to become the meringue, unbaked or baked, has rheological properties which are not compatible with current methods.

SUMMARY OF THE INVENTION

The present invention aims to overcome these disadvantages by proposing a method of making a pastry in the shape of a cone as well as equipment and an apparatus for implementing this method, allowing a cone to be simply made from a preparation which is different from a pastry to be rolled out or a wafer.

More particularly, the present invention aims to propose an apparatus for making a pastry in the shape of a cone as well as equipment and a production method allowing this apparatus to be used, allowing a cone to be simply made from a meringue-type preparation or other preparation having similar rheological properties.

To this end, the present invention relates to an apparatus for making a pastry in the shape of a cone, comprising a base carrying at least one plate, at least one cone holder arranged to be able to be removably mounted on said plate, at least one conical mould arranged to be able to be removably mounted on the cone holder, and guide means able to guide a tool for depositing a preparation intended to become the pastry, said guide means and the cone holder being arranged such that said depositing tool and the conical mould mounted on the cone holder are able to move with respect to each other so as to be able to deposit, on said conical mould, the preparation intended to become the pastry so as to obtain at least one cone of said preparation formed around the conical mould.

In accordance with a first embodiment of the invention, the plate is a rotating plate and the means for guiding the depositing tool are arranged to assist said depositing tool in moving along the conical mould mounted on the cone holder when said cone holder is rotationally driven by the rotating plate, the moving speed of the depositing tool and the rotational speed of the cone holder being selected such that the depositing tool is intended to move along a single generatrix of the conical mould so as to be able to deposit, around said conical mould, continuous and contiguous turns of the preparation intended to become the pastry so as to obtain at least one cone formed of continuous and contiguous turns of said preparation formed around the conical mould.

In accordance with another embodiment of the invention, the plate is a rotating plate and the means for guiding the depositing tool are arranged to assist said depositing tool in moving along the conical mould mounted on the cone holder when said cone holder is rotationally driven by the rotating plate, the moving speed of the depositing tool and the rotational speed of the cone holder being selected such that the depositing tool is intended to move along different generatrixes of the conical mould following the directrix, so as to be able to deposit, on said conical mould, contiguous lines following the generatrixes of the preparation intended to become the pastry so as to obtain at least one cone formed of contiguous generatrix lines of said preparation formed around the conical mould.

The present invention likewise relates to equipment for making a pastry in the shape of a cone from a preparation intended to become the pastry, comprising an apparatus as defined above, and a tool for depositing said preparation intended to become the pastry comprising a reservoir for said preparation, said depositing tool being arranged to cooperate with the guide means of the apparatus and the cone holder such that said depositing tool and the conical mould mounted on the cone holder move with respect to each other so as to be able to deposit, on said conical mould, preferably continuously, the preparation intended to become the pastry to obtain at least one cone of said preparation formed around the conical mould.

The present invention likewise relates to a method for making a pastry in the shape of a cone from a preparation intended to become the pastry by using the apparatus and the equipment as defined above, said method comprising the steps of:

a) placing the cone holder on the plate
b) positioning means for guiding the tool for depositing the preparation intended to become the pastry so as to be able to position said depositing tool in parallel with a generatrix of the conical mould
c) placing the conical mould on the cone holder
d) depositing the preparation intended to become the pastry around the conical mould by moving said conical mould mounted on the cone holder and the depositing tool guided by the guide means with respect to each other so as to deposit, on said conical mould, preferably continuously, the preparation intended to become the pastry to obtain at least one cone of said preparation formed around the conical mould e) removing the cone holder, carrying the conical mould covered by the preparation intended to become the pastry, from the plate f) placing the cone holder, carrying the conical mould covered by the preparation intended to become the pastry, in a baking oven g) baking the cone of preparation intended to become the pastry h) removing the cone holder, carrying the conical mould covered by the baked preparation intended to become the pastry from the baking oven i) separating the conical mould covered by the baked preparation intended to become the pastry from the cone holder j) removing the baked preparation intended to become the pastry from the conical mould to obtain a pastry in the shape of a cone.

In accordance with a first variant of the method of the invention, the plate is a rotating plate and the preparation intended to become the pastry is deposited around the conical mould by rotating said conical mould mounted on the cone holder driven by the rotating plate and by moving, in a translational manner, the depositing tool guided by the guide means along the conical mould, the moving speed of the depositing tool and the rotational speed of the cone holder being selected such that the depositing tool moves along a single generatrix of the conical mould so as to deposit, around said conical mould, continuous and contiguous turns of the preparation intended to become the pastry to obtain at least one cone formed of continuous and contiguous turns of said preparation formed around the conical mould.

In accordance with another variant of the method of the invention, the plate is a rotating plate and the preparation intended to become the pastry is deposited around the conical mould by rotating said conical mould mounted on the cone holder driven by the rotating plate and by moving, multiple times in a translational manner, the depositing tool guided by the guide means along the conical mould, the moving speed of the depositing tool and the rotational speed of the cone holder being selected such that the depositing tool moves along different generatrixes of the conical mould following the directrix, so as to deposit, on said conical mould, contiguous lines following the generatrixes of the preparation intended to become the pastry to obtain at least one cone formed of contiguous generatrix lines of said preparation formed around the conical mould.

The apparatus, the equipment and the method in accordance with the invention permit the use of meringue preparation-type preparations to simply and easily form hollow cones formed from said baked preparation.

The present invention likewise relates to a pastry in the shape of a cone obtained by implementing the above-described method and made of meringue. Preferably, the cone is formed from continuous and contiguous turns or from continuous generatrix lines of meringue.

The pastry in the shape of a meringue cone preferably has a circular or polygonal directrix.

BRIEF DESCRIPTION OF THE DRAWINGS

Other features and advantages of the present invention will become clear upon reading the following detailed description of a preferred embodiment of the invention, given by way of non-limiting example, and given with reference to the attached drawings in which.

DESCRIPTION OF THE PREFERRED EMBODIMENTS

In the present description, "a pastry" is intended to mean a preparation of a savoury or sweet mixture baked in the oven. The mixture used in the present invention has rheological properties allowing it to be extruded using the tool for depositing said preparation and allowing it to be held on the conical mould before baking in the form of a cone, as will be described hereinafter. Such a mixture is preferably a meringue preparation, made from a traditional recipe, known to the person skilled in the art. It can likewise be any other type of preparation of a savoury or sweet mixture having a suitable consistency allowing the implementation of the method of the invention.

In the present invention, "cone" is intended to mean a hollow solid delimited by a conical surface generated by a straight line (generatrix) passing through a fixed point (tip or apex) and a variable point describing a closed curve (directrix). This definition includes a cylinder which is considered to be a cone whose tip is at infinity, the generatrixes thus being parallel.

The directrix curve is preferably a circle or a polygon. Preferably, the cone is a right cone.

In the present invention, the cone has a certain height to provide the interior of the cone with a filling space of a certain depth, like an ice-cream cone. Preferably, the height of the cone is greater than the dimensions of its base.

In terms of a cylinder, it is possible to provide one or two bases made from the preparation intended to become the pastry to close one end, or perhaps both ends, of the cylinder.

In accordance with the invention, the apparatus for making a pastry in the shape of a cone comprises a base carrying at least one plate, at least one cone holder arranged to be able to be removably mounted on said plate, at least one conical mould arranged to be able to be removably mounted on the cone holder, and guide means able to guide a tool for depositing a preparation intended to become the pastry, said guide means and the cone holder being arranged such that said depositing tool and the conical mould mounted on the cone holder are able to move with respect to each other so as to be able to deposit, on said conical mould, preferably continuously, the preparation intended to become the pastry so as to obtain at least one cone of said preparation formed around the conical mould.

Figure 1:
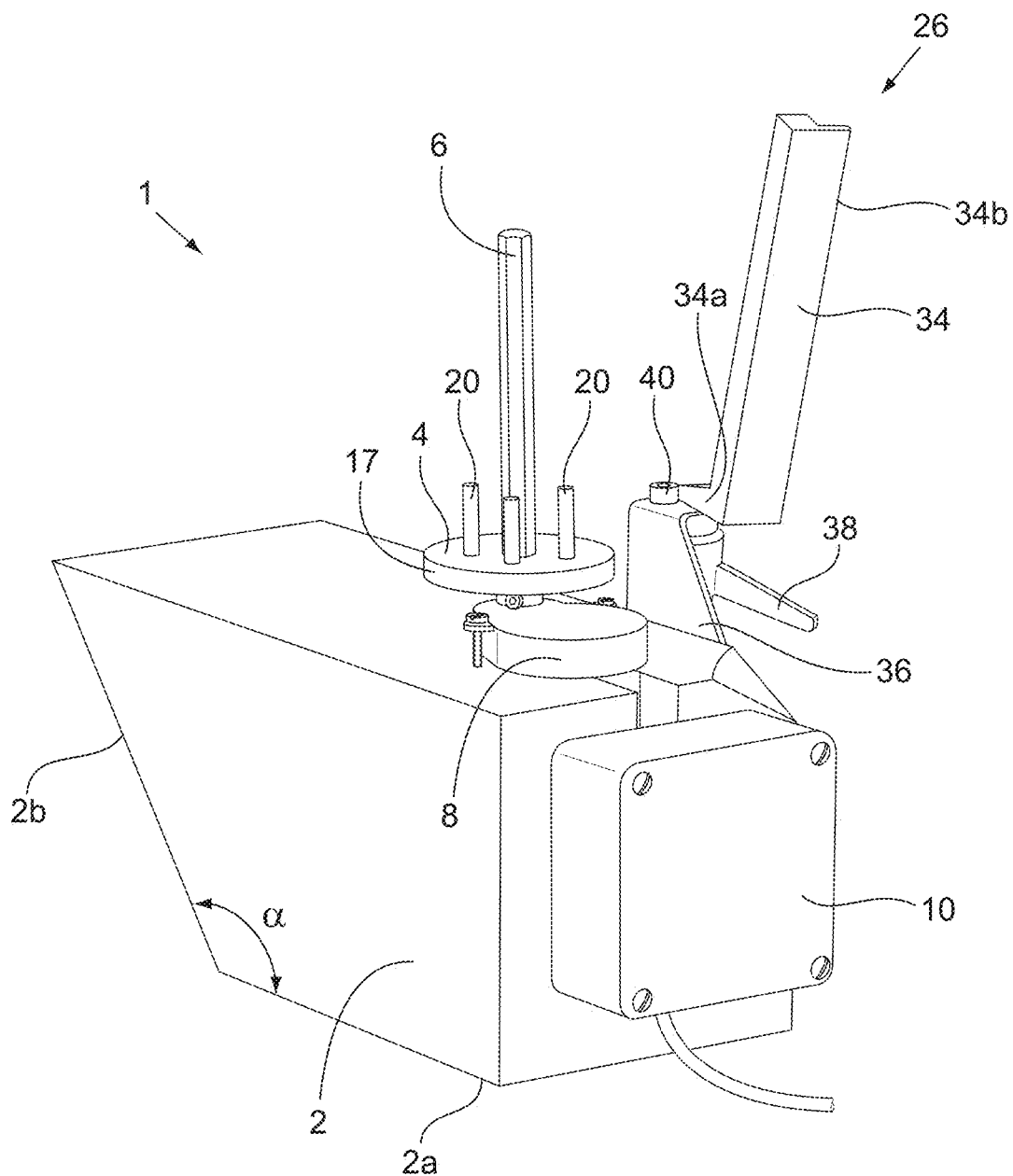
FIG. 1 is a perspective view of an apparatus in accordance with the invention.
Figure 2:
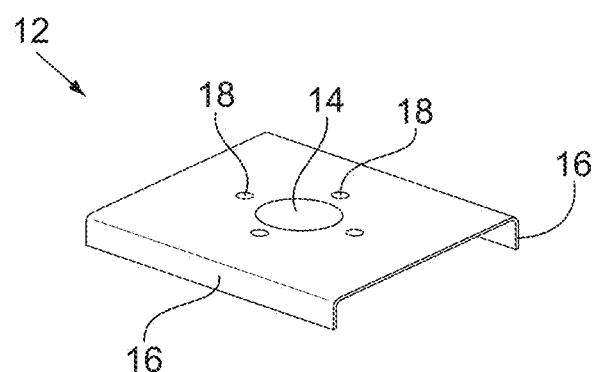
FIG. 2 is a perspective view of a cone holder used in the invention.
Figure 3:
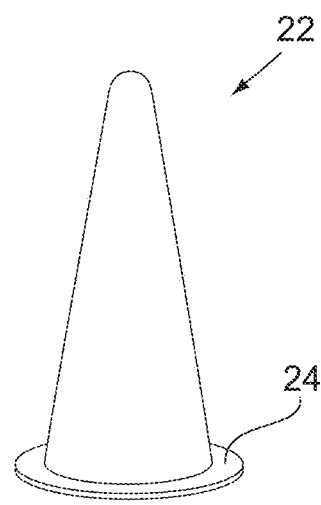
FIG. 3 illustrates a perspective view of the conical mould.

With reference to FIGS. 1 to 3, there is shown a first embodiment of the apparatus in accordance with the invention allowing a pastry to be made in the shape of a cone formed of continuous and contiguous turns, the directrix of the cone being a circle.

The apparatus 1 comprises a base 2 intended to be positioned on a frame or a worktop (not shown). The base 2 has at least one rotating plate 4, preferably a circular plate, mounted on a shaft 6 for conjoint rotation therewith, said shaft 6 being arranged to be rotationally driven by a suitable motor 8 provided on the base 2. Electrical connection means 10 are provided to supply the motor 8 with power and to rotate the shaft 6. The shaft 6 has a certain height, suitable to receive a conical mould, as will be described hereinafter.

As shown more specifically in FIG. 2, the apparatus 1 also comprises at least one cone holder 12 formed of a flat plate, preferably a metal plate, having in its centre an orifice 14 of suitable dimensions allowing the cone holder 12 to be mounted on the rotating plate 4 around the shaft 6 by introducing the shaft 6 into the orifice 14. The cone holder 12 also comprises at least two side edges 16 sized to come to be positioned around the rotating plate 4 and preferably to come to fit around the peripheral edge 17 of said rotating plate 4. The cone holder 12 also comprises four small orifices 18 positioned symmetrically and concentrically around the orifice 14. Each orifice 18 is arranged to receive a positioning pin 20 protruding from the rotating plate 4, the positioning pins 20 being arranged in a corresponding manner around the shaft 6 (only three positioning pins are shown in FIG. 1).

The peripheral edge 17 of the plate 4 and the positioning pins 20 form means for fixing and centring the cone holder 12, said means being provided on the rotating plate 4 and arranged such that the cone holder 12 can be removably mounted on said rotating plate 4.

Figure 4:
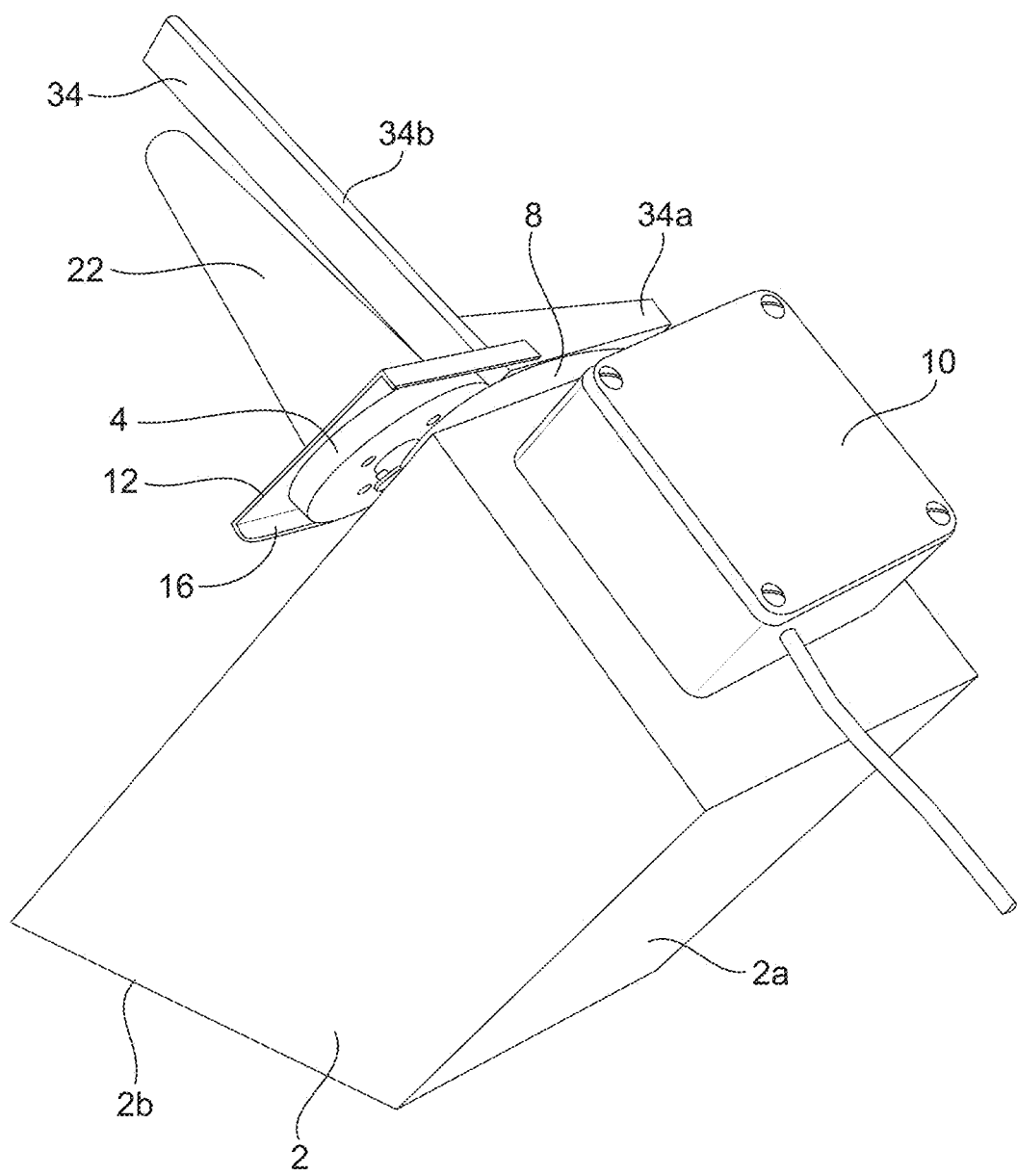
FIGS. 4 to 8 illustrate different steps of a method of the invention.

With reference to FIG. 3, the apparatus 1 of the invention also comprises a conical mould 22 arranged to be able to be removably mounted on the cone holder 12. The conical mould 22 is preferably a hollow right cone with a disc-shaped base. On its base, it has an outer peripheral edge 24 arranged to be positioned on the cone holder 12. The dimensions of the conical mould 22 and in particular its height as well as the diameter of its base are selected such that when the conical mould 22 is positioned on the cone holder 12, the apex of the conical mould 22 fits on the upper, free, end of the shaft 6 and the base of the conical mould 22 rests on the cone holder 12 around the four positioning pins 20 protruding from the cone holder 12 through the orifices 18, as shown in FIG. 4. Therefore, the cone holder 12 and the conical mould 22 can be mounted on the rotating plate 4 so as to be attached to said rotating plate 4 for conjoint rotation therewith when the latter is rotationally driven for depositing the preparation intended to become the pastry on the conical mould 22, but likewise so as to be removable so as to be able to be separated from the rotating plate 4 for the other steps of the method, and in particular for the baking step. Furthermore, the conical mould 22 is likewise removably mounted on the cone holder 12 so as to be able to be separated from the cone holder 12 when the preparation is removed from the mould, as will be described hereinafter.

The conical mould 22 is preferably made from silicone, or any other suitable material.

With reference to FIGS. 1 and 4 to 6, the apparatus in accordance with the invention also comprises guide means 26 able to guide a depositing tool 28 provided to deposit the preparation intended to become the pastry around the conical mould 22. Said guide means 26 are arranged to assist said depositing tool 28 in moving along the conical mould 22 mounted on the cone holder 12 when said cone holder 12 is rotationally driven by the rotating plate 4, the moving speed of the depositing tool 28 and the rotational speed of the cone holder 12 being selected such that the depositing tool 28 is intended to move along a single generatrix of the conical mould 22 so as to be able to deposit, around said conical mould 22, continuous and contiguous turns 30 of the preparation intended to become the pastry so as to obtain at least one cone 32 formed of continuous and contiguous turns 30 of said preparation formed around the conical mould 22.

Preferably, the means 26 for guiding the depositing tool 28 are arranged to assist the positioning of said depositing tool 28 in parallel with a generatrix of the conical mould 22 at least during the depositing of the preparation intended to become the pastry around said conical mould. To this end, the guide means 26 can advantageously comprise a bar 34 mounted so as to be pivotable with respect to the base 2. The bar 34 comprises a foot 34a pivotably mounted, in the plane perpendicular to its pivot axis, on a bracket 36 fixedly attached to the base 2. The pivot angle of the foot 34a to move between a neutral position and a usage position is adjustable using a handle 38. A stop 40 is provided on the bracket to determine the usage position of the bar 34. Said bar 34 forms an angle with its foot 34a allowing the bar 34 to be in parallel with a generatrix of the conical mould 22 when it is in the usage position, its foot 34a being against the stop 40.

In an advantageous manner, the bar 34 has at least one longitudinal guide edge 34b able to receive at least one groove provided on the depositing tool 28, as will be described hereinafter.

Advantageously, the base 2 can comprise a first support surface 2a arranged to be placed on the frame or worktop when the cone holder 12 is placed on the rotating plate 4, and a second support surface 2b which is inclined or bevelled with respect to the first support surface 2a and is arranged to be placed on said frame or worktop at least when the preparation intended to become the pastry is to be deposited on the conical mould 22. The angle α between the first and second support surfaces 2a, 2b is selected such that the shaft 6 is substantially vertical in the rest position or when the cone holder 12 is placed on the rotating plate 4 and such that the shaft 6 (or the longitudinal axis of the conical mould 22) is not vertical at least when the preparation is deposited on the conical mould 22. This tipping of the base 2 on its support surfaces 2a or 2b allows, on the one hand, the cone holder 12 to be readily mounted on the rotating plate 4 and, on the other hand, the preparation to then be easily deposited around the conical mould 22 using the depositing tool 28.

The invention likewise relates to equipment comprising the apparatus 1, in particular as described above, as well as the depositing tool 28.

Figure 5:
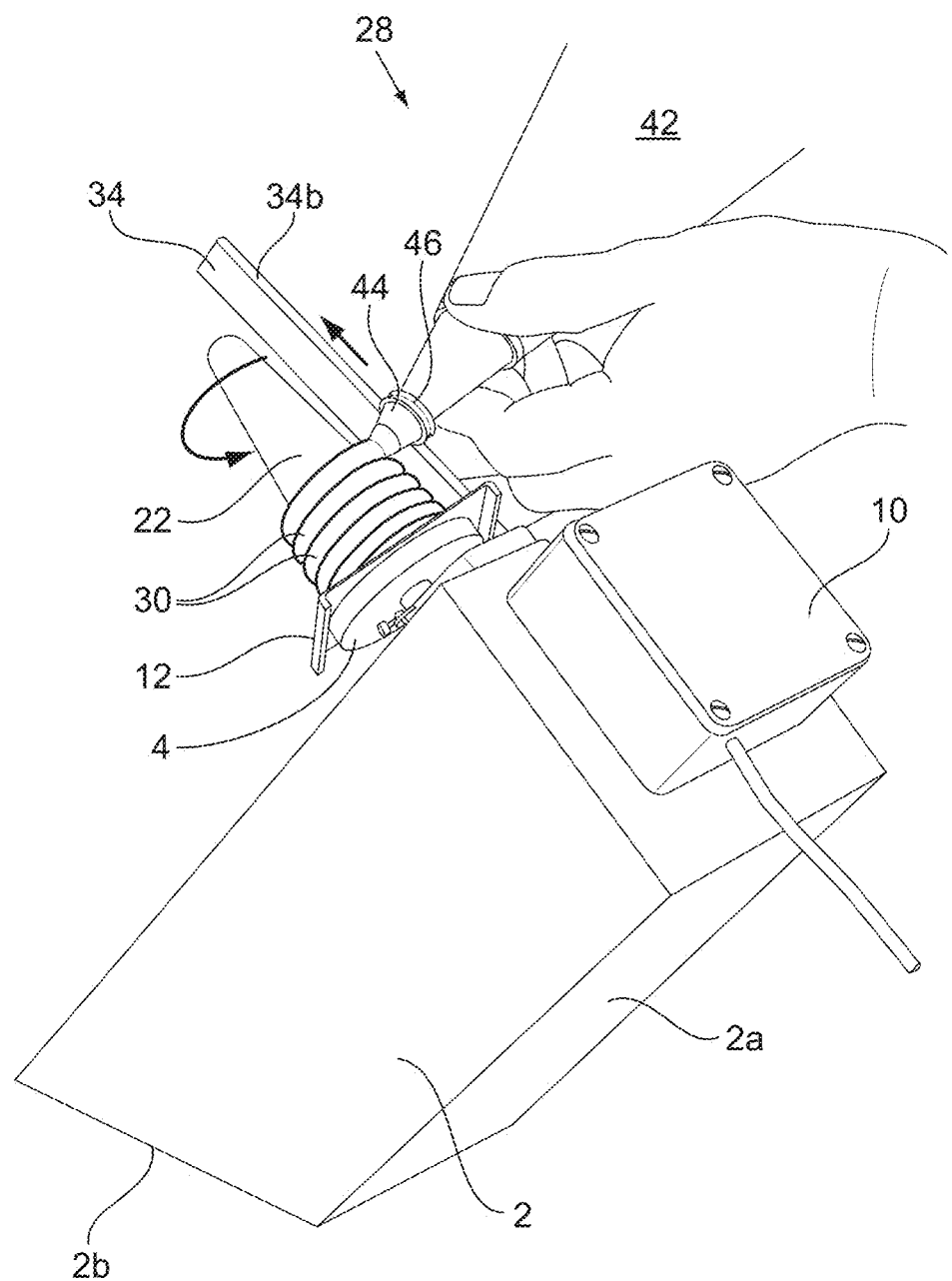

With reference to FIG. 5, the depositing tool 28 comprises a reservoir 42 in which there is placed the preparation intended to become the pastry and an end fitting 44 having an opening with a shape allowing a strand of said preparation to be delivered therefrom to form the turns 30, said depositing tool 28 being arranged to cooperate with the guide means 26 of the apparatus so as to be able to move along the conical mould 22 mounted on the cone holder 12 when said cone holder 12 is rotationally driven by the rotating plate 4 so as to be able to deposit, around said conical mould 22, continuous and contiguous turns 30 of the preparation intended to become the pastry to obtain at least one cone 32 of said preparation formed around the conical mould 22.

Advantageously, the end fitting 44 cooperates with the guide means 26. For this purpose, the end fitting 44 has, in this embodiment, a peripheral groove 46 within which the guide edge 34b of the bar 34 can slide.

The depositing tool 28 can be of the piping bag-type, handled by a user or an automated device designed to form the strand of preparation by extrusion.

The method of making a pastry in the shape of a cone formed of continuous and contiguous turns 30 from a preparation intended to become the pastry by using the apparatus and the equipment described above comprises the first step a) consisting of placing the cone holder 12 on the rotating plate 4 by introducing the shaft 6 into the orifice 14 and introducing the positioning pins 20 into the orifices 18. Since the base 2 is thus placed on its first support surface 2a, the shaft 6 is substantially vertical.

Then, in accordance with step b), the means 26 for guiding the tool 28 for depositing the preparation intended to become the pastry are placed so as to be able to position said depositing tool 28 in parallel with a generatrix of the conical mould 22. To do this, the foot 34a of the bar 34 is pivoted into its usage position using the handle 38 to come against the stop 40 such that the bar 34 is in parallel with a generatrix of the conical mould 22.

Preferably, the method further comprises a step of positioning the base 2 on its second support surface 2b to incline it and position the cone holder 12 such that the shaft 6 or the longitudinal axis of the conical mould 22 will not be vertical at least when the preparation intended to become the pastry will be deposited. This step is to be performed at the latest before step d) and preferably before step c).

Then, in accordance with step c), the conical mould 22 is placed on the cone holder 12 by arranging the base 24 of the conical mould 22 around the positioning pins 20 and the apex of the conical mould 22 at the tip of the shaft 6, as shown in FIG. 4. The order of steps b) and c) can be inverted.

Figure 6:
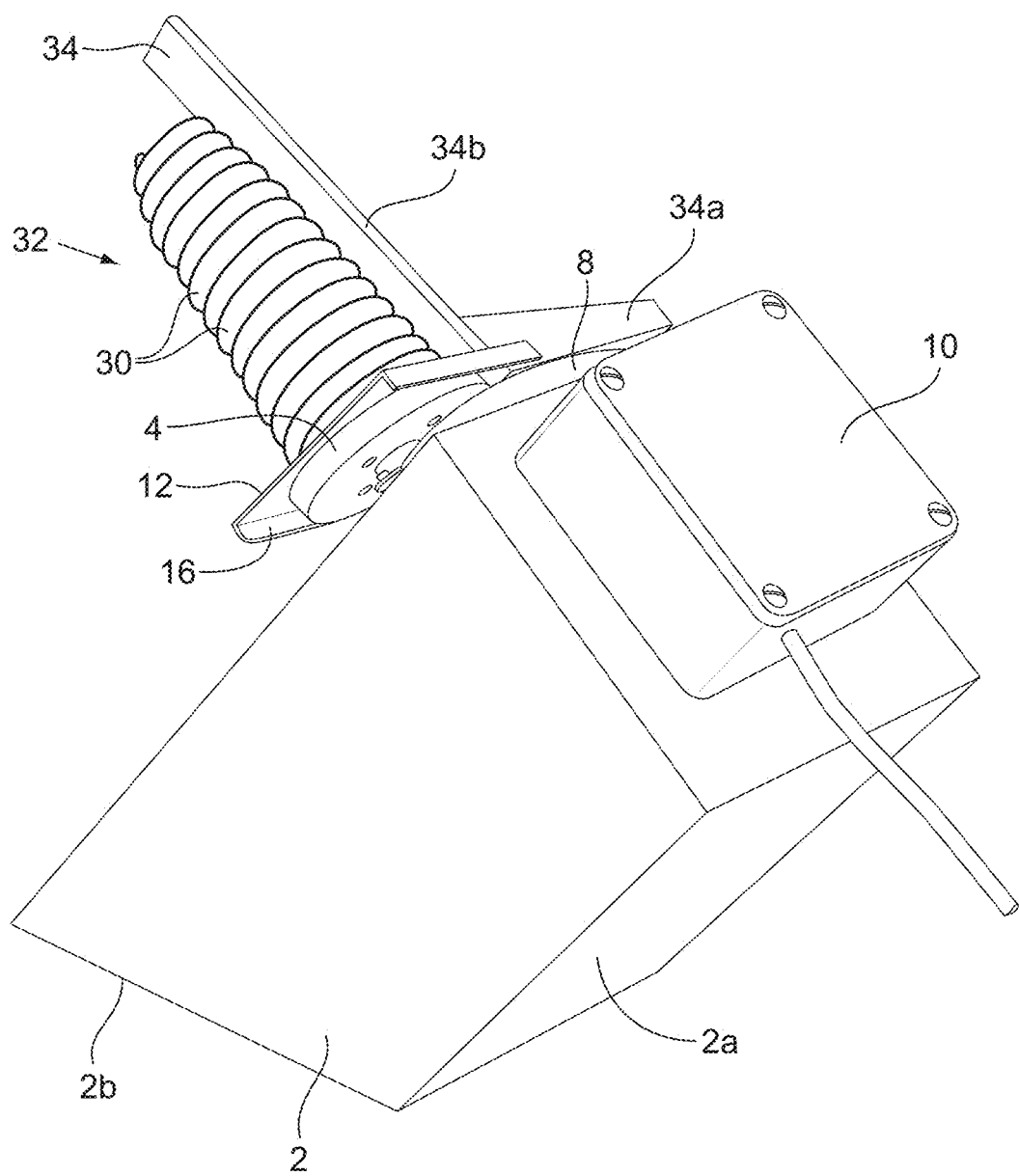

Then, in accordance with step d), the motor 8 is started to rotate the shaft 6 in the anti-clockwise direction as seen from below and to rotationally drive the rotating plate 4 carrying the cone holder 12 and the conical mould 22. In parallel, the depositing tool 28, the reservoir 42 of which is filled with preparation intended to become the pastry, is positioned on the guide means 26 such that the guide edge 34b of the bar 34 can slide in the peripheral groove 46. As shown in FIG. 5, the depositing tool 28, guided by the guide means 26, is moved in a translational, continuous and steady manner along the conical mould 22 from the base of said conical mould 22 to its tip, the moving speed of the depositing tool 28 and the rotational speed of the cone holder 12 being selected such that the depositing tool 28 moves along a single generatrix of the conical mould 22 so as to deposit, around said conical mould 22, a strand of the preparation intended to become the pastry by forming continuous and contiguous turns 30 to obtain at least one cone 32 formed of continuous and contiguous turns 30 of said preparation formed around the conical mould 22, as shown in FIG. 6. Then, the motor 8 is stopped and the depositing tool 28 is moved away. The guide means 26 are returned to their neutral position by pivoting the bar 26.

Figure 7:
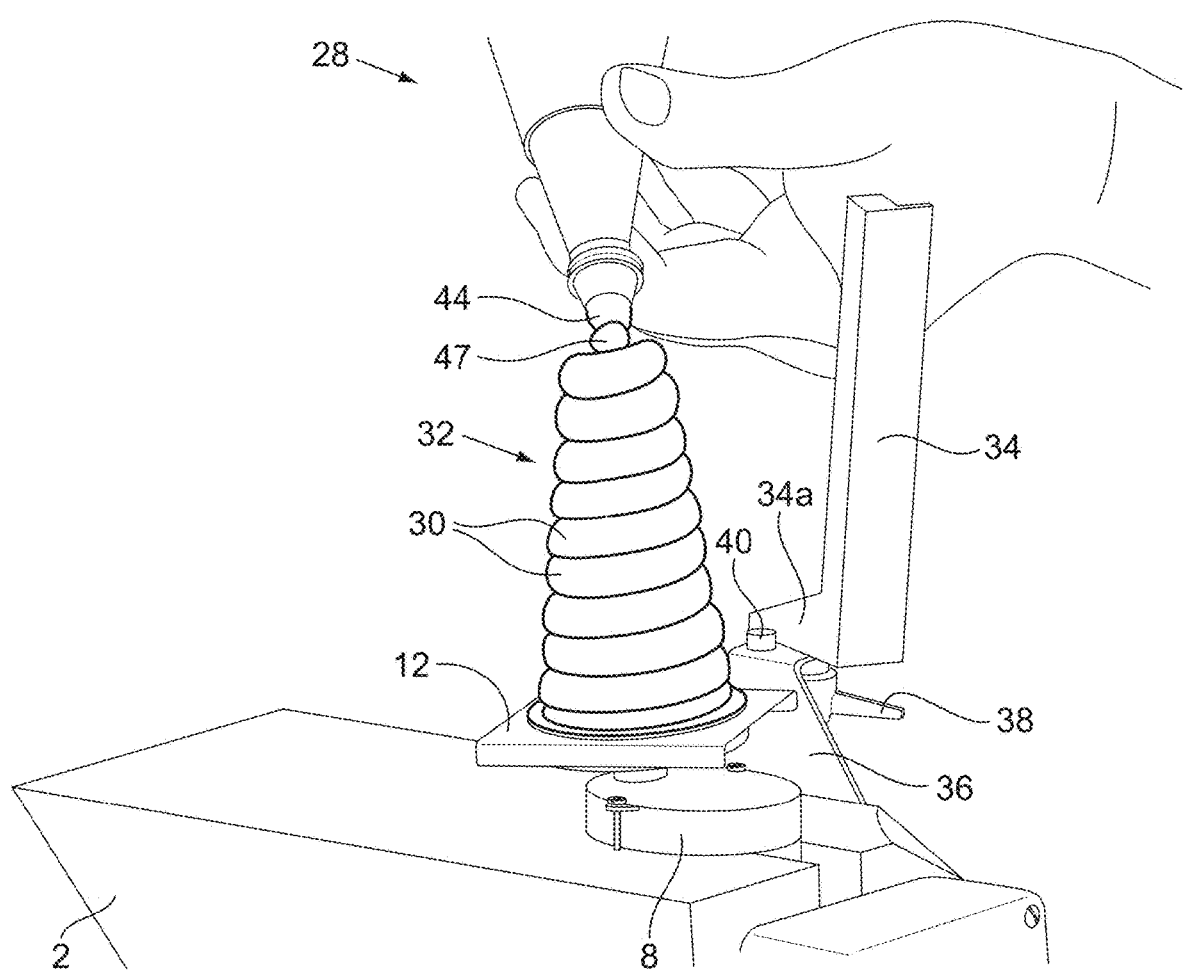

Preferably, the method further comprises, after step d), a step of repositioning the base 2 on its first support surface 2a to reposition the conical mould 22 and the cone holder 12 such that the longitudinal axis of the conical mould 22 is substantially vertical, as shown in FIG. 7.

If needed, the method can then comprise an additional step of depositing a tip 47 of preparation at the end of the cone 32 so as to properly close the cone 32. This step is performed by moving the depositing tool 28 so as to face the tip of the cone 32, as shown in FIG. 7.

Figure 8:
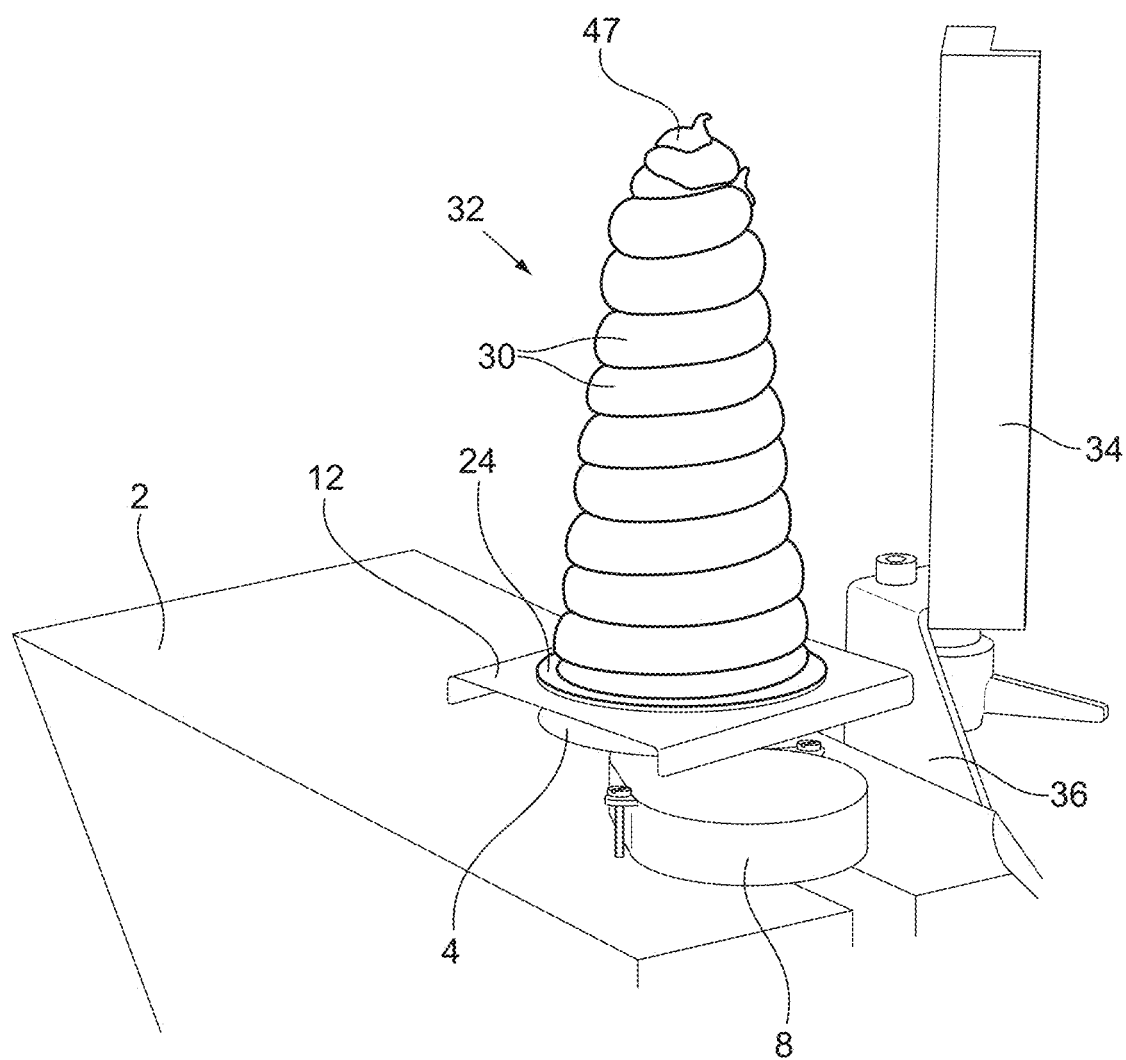

Then, as shown in FIG. 8, the cone holder 12 carrying the conical mould 22 covered by the preparation intended to become the pastry is removed from the rotating plate 4 in accordance with step e) and is placed in a baking oven in accordance with step f) of the method.

Figure 9:
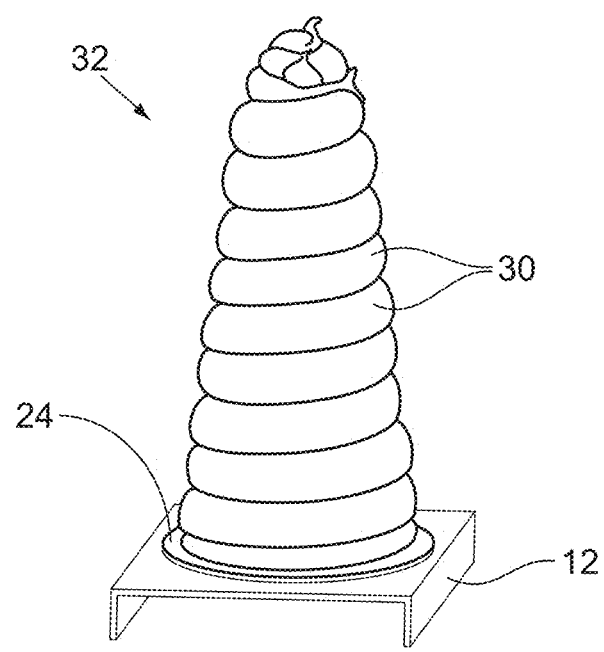
FIG. 9 illustrates a perspective view of a cone on its cone holder.

Then, the cone 32 of preparation intended to become the pastry is baked in accordance with step g) and then the cone holder 12 carrying the conical mould 22 covered by baked preparation is removed from the baking oven in accordance with step h), as shown in FIG. 9.

Figure 10:
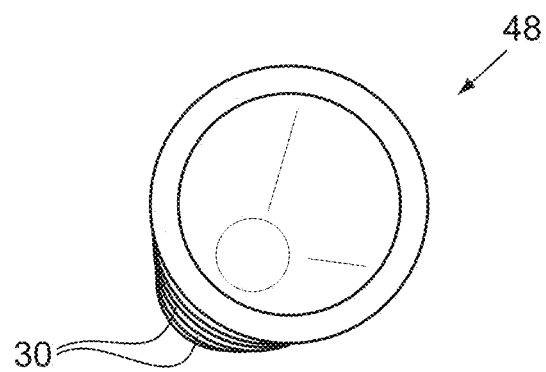
FIG. 10 illustrates a view of the interior of a cone made in accordance with the invention.
Figure 11:
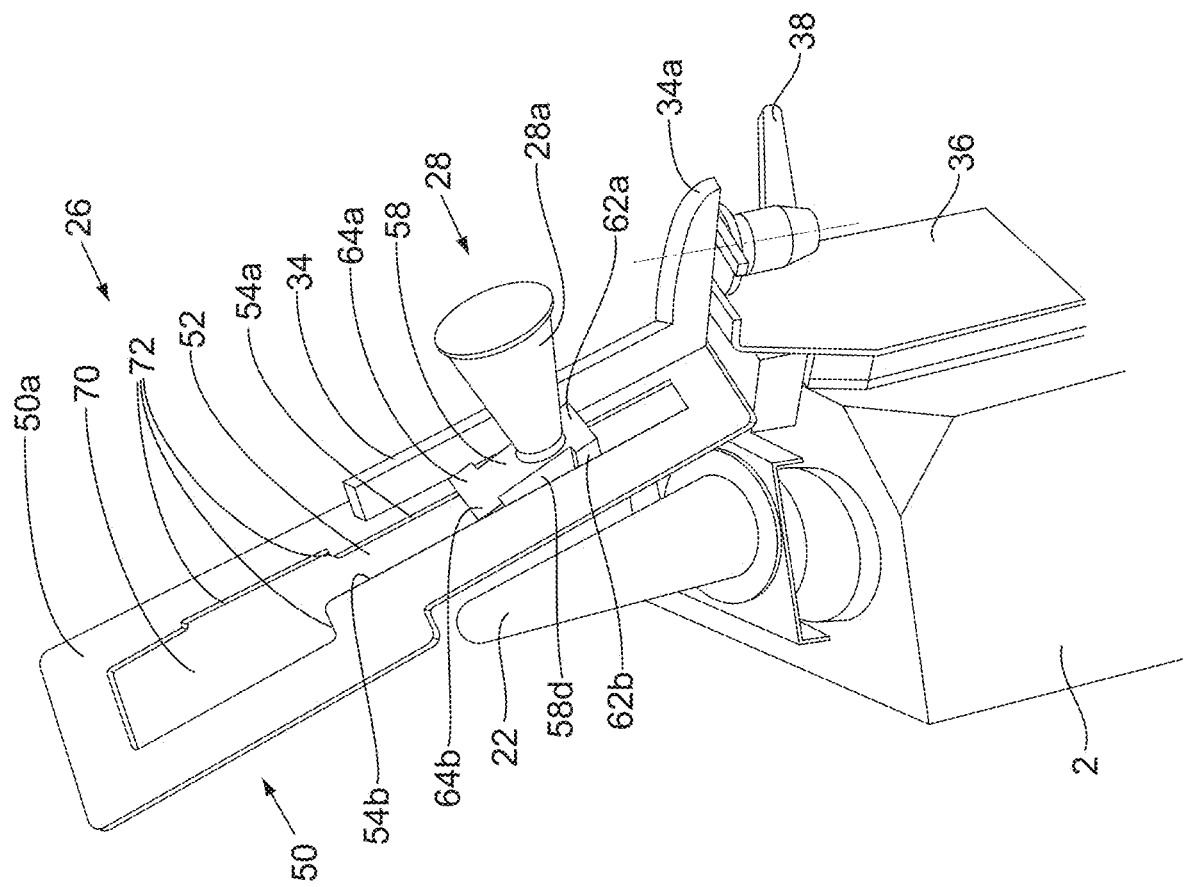
FIG. 11 illustrates a second embodiment of the means for guiding the tool for depositing the preparation intended to become the pastry.

Finally, the conical mould 22 covered by baked preparation is separated from the cone holder 12 in accordance with step i) and then the baked preparation is separated from the conical mould 22 to obtain a pastry 48 in the shape of a hollow, rigid cone formed of continuous and contiguous turns 30 as shown in FIG. 10. It is clear that the depositing tool can be arranged to start depositing the strand of the preparation at the tip of the cone.

With reference to FIGS. 11 to 15, there is described a second embodiment of the means for guiding the tool 28 for depositing the preparation intended to become the pastry to assist the positioning of said depositing tool 28 in parallel with a generatrix of the conical mould 22 at least during the depositing of said preparation. The elements in common with the first embodiment described above are provided with the same references. In this second embodiment, the bar 34 is still mounted so as to be pivotable at its foot 34a on a bracket 36 fixedly attached to the base 2, its position being pivotably adjustable using the handle 38.

In this case, the bar 34 is provided with a runner 50 in the form of an elongate plate with a longitudinal axis in parallel with the longitudinal axis of the bar 34 and having a main upper face 50a facing the depositing tool 28 and a main lower face 50b intended to come to face the conical mould 22. The runner 50 is fixed to the bar 34 by its main upper face 50a such that said face 50a is perpendicular to the bar 34.

The runner 50 has a central longitudinal opening 52 delimited by two mutually facing longitudinal guide edges 54a, 54b defining a channel, each of said guide edges 54a, 54b being able to receive a lateral groove 56a, 56b provided on a guide carriage 58 arranged to carry the tool 28 for depositing the preparation intended to become the pastry.

Figure 12:
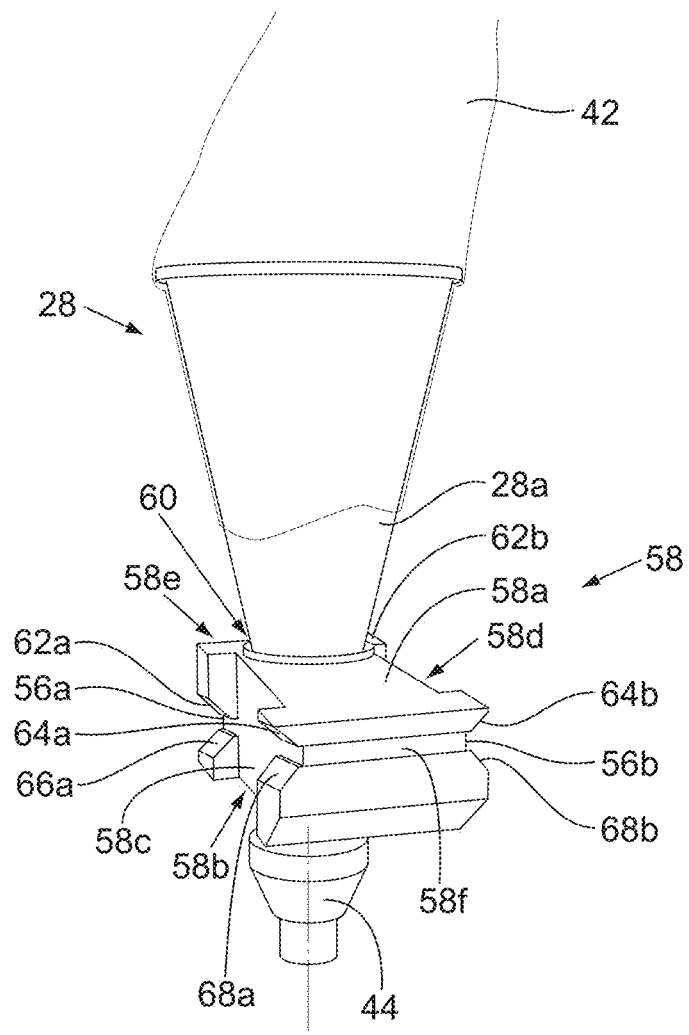
FIG. 12 is a rear perspective view of the guide carriage used in the present invention.
Figure 13:
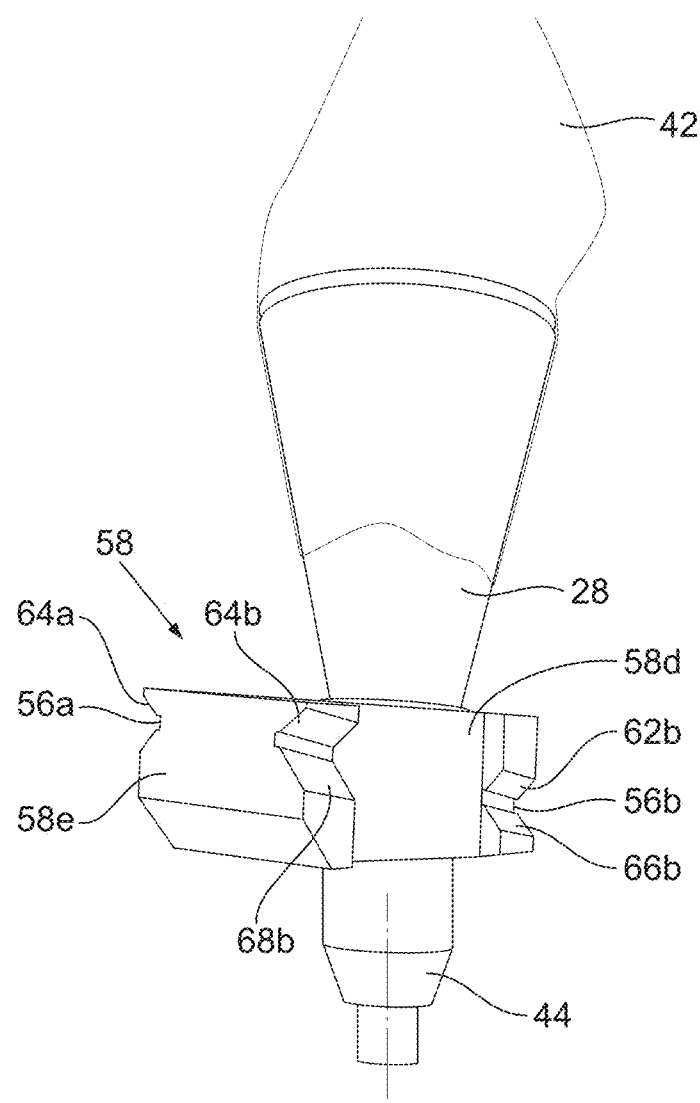
FIG. 13 is a side perspective view of the guide carriage used in the present invention.

As shown more precisely in FIGS. 12 and 13, the guide carriage 58 comprises a body which is generally parallel-epiped in shape and is delimited by a longitudinal main upper face 58a, a longitudinal main lower face 58b, two side faces 58c and 58d, a front face 58e and a rear face 58f.

The guide carriage 58 has, between its longitudinal main upper 58a and lower 58b faces, a through-going orifice 60, the inlet of the orifice 60 on the main upper face 58a being intended to receive the piping tube 28a of the depositing tool 28 and the outlet of the orifice 60 on the main lower face 58b being intended to receive the end fitting 44 having an opening with a shape allowing a strand of said preparation to be delivered therefrom. The inlet of the orifice 60 can be threaded to be able to screw the piping tube 28a therein. The end fitting 44 can be formed in a single piece with the guide carriage 58.

The body of the guide carriage 58 has, on its two side faces 58c and 58d, side grooves 56a and 56b respectively, in which the guide edges 54a and 54b respectively of the runner 50 can slide.

Advantageously, said grooves 56a and 56b can be formed in an inclined manner with respect to the planes of the main upper and lower faces 58a, 58b, the inclination being selected based on the inclination to be given to the end fitting 44 with respect to the bar 34, and thus with respect to the conical mould 22.

In an advantageous manner, the main faces 58a, 58b of the body of the guide carriage 58 have front and rear ends having a T-shaped cross-section defining front 62a, 62b and rear 64a, 64b upper glides and front 66a, 66b and rear 68a, 68b lower glides. The width of the front and rear ends of the body of the guide carriage 58 is greater than the width of the central opening 52 such that the front 62a, 62b and rear 64a, 64b upper glides are arranged to slide on the main upper face 50a of the runner 50 and the front 66a, 66b and rear 68a, 68b lower glides are arranged to slide on the main lower face 50b of the runner 50 when the guide carriage 58 is mounted on the runner 50. Therefore, the guide carriage 58 is perfectly guided by the runner 50 when it moves along the guide edges 54a and 54b of said runner 50.

Advantageously, the runner 50 has, at its upper end, an inner passage 70 with chicanes 72, said passage 70 being wider than the central opening 52. This passage 70 allows the introduction and removal of the guide carriage 58 to be facilitated.

Figure 14:
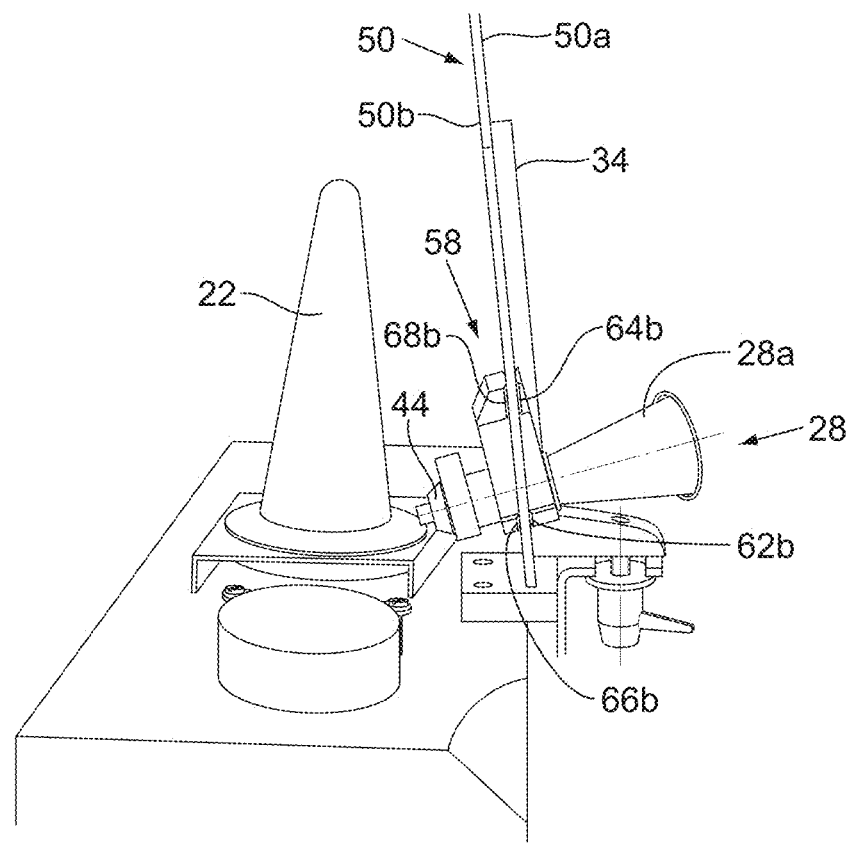
FIGS. 14 and 15 illustrate perspective views of the apparatus in accordance with the invention equipped with guide means in accordance with the second embodiment, in the initial position and in the final position respectively.
Figure 15:
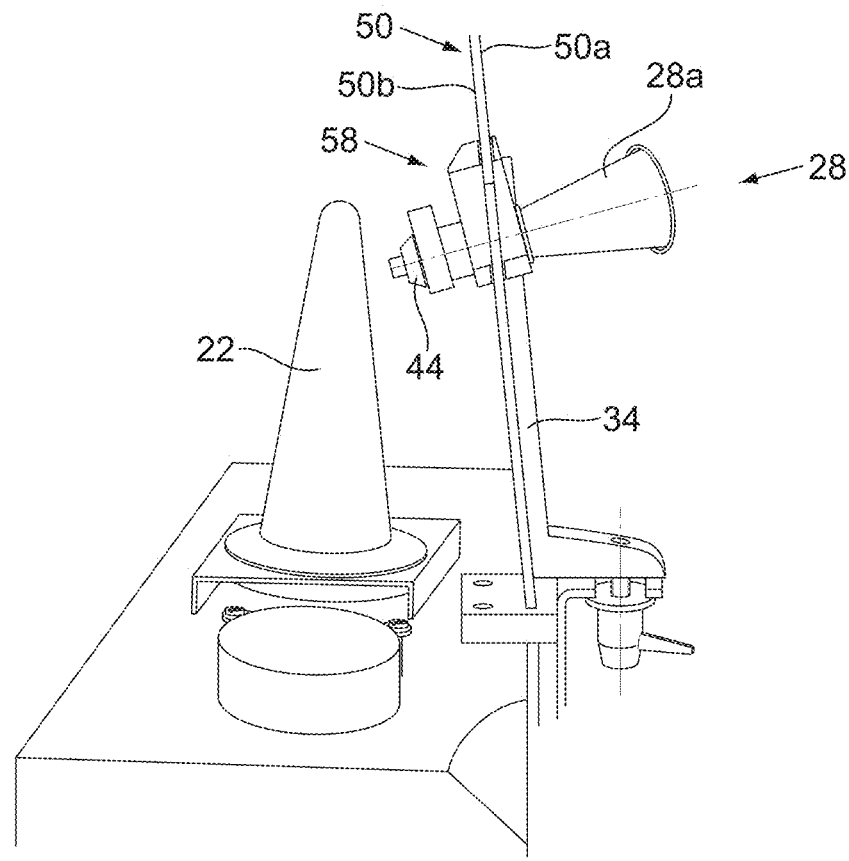

During step d) of the method of the invention, the piping tube 28a of the depositing tool 28, the reservoir 42 of which is filled with preparation intended to become the pastry, is screwed to the upper face 58a of the guide carriage 58. Then, the guide carriage 58 carrying the depositing tool 28 is introduced into the runner 50 through the passage 70 and then into the central opening 52 such that the guide edges 54a, 54b of the runner 50 can slide in the side grooves 56a, 56b respectively of the guide carriage 58. The guide carriage 58 with the depositing tool 28 is brought to the bottom of the runner 50, in the initial depositing position, the end fitting 44 being positioned facing the conical mould 22, as shown in FIG. 14. Then, the depositing tool 28 carried by the guide carriage 58 guided in the runner 50 is moved in a translational, continuous and steady manner along the conical mould 22, from the base of said conical mould 22 to its tip, in the final depositing position, as shown in FIG. 15. The guide carriage 58 with the depositing tool 28 is removed from the runner 50 through the passage 70. The method continues as described above.

In accordance with another variant, not shown, the means 26 for guiding the depositing tool 28 can be arranged to assist said depositing tool 28 in moving along the conical mould 22 mounted on the cone holder 12 when said cone holder 12 is rotationally driven by the rotating plate 4, the moving speed of the depositing tool 28 and the rotational speed of the cone holder 12 being selected such that the depositing tool 28 moves along different generatrixes of the conical mould 22 following the directrix, so as to be able to deposit, on said conical mould 22, strands of the preparation intended to become the pastry forming contiguous lines following the generatrixes of the cone so as to obtain at least one cone 32 formed of contiguous generatrix lines of said preparation formed around the conical mould 22. Preferably, the depositing tool 28 is arranged to effect several alternating translational movements along the conical mould 22 such that the contiguous generatrix lines of preparation are continuously deposited on the conical mould 22. It is clear that the depositing tool can be arranged to deposit a strand of preparation only in one direction, the movement in the opposite direction being neutral.

The pastry 48 can be used as an edible holder ready to be filled to make ice-creams or different dishes in which the cone of baked preparation is filled with savoury or sweet preparations.

The method in accordance with the invention allows a pastry to be simply and quickly made in the shape of cone from a preparation which, when unbaked, has certain rheological properties allowing it, in particular, to be extruded using the depositing tool and which, once baked, has a certain amount of rigidity preventing any subsequent shaping. Preferably, the cone is made of meringue and is formed of continuous and contiguous turns 30 or of contiguous generatrix lines. It preferably has a circular or polygonal directrix curve.

The invention claimed is:

1. Apparatus (1) for making a pastry (48) in the shape of a cone, comprising a base (2) carrying at least one plate (4), at least one cone holder (12) arranged to be able to be removably mounted on said plate (4), at least one conical mould (22) arranged to be able to be removably mounted on the cone holder (12), and guide means (26) able to guide a tool (28) for depositing a preparation intended to become the pastry, said guide means (26) and the cone holder (12) being arranged such that said depositing tool (28) and the conical mould (22) mounted on the cone holder (12) are able to move with respect to each other so as to be able to deposit, on said conical mould (22), the preparation intended to become the pastry so as to obtain at least one cone (32) of said preparation formed around the conical mould (22).

2. The apparatus (1) as claimed in claim 1, wherein the plate (4) is a rotating plate, and wherein the means (26) for guiding the depositing tool (28) are arranged to assist said depositing tool (28) in moving along the conical mould (22) mounted on the cone holder (12) when said cone holder (12) is rotationally driven by the rotating plate (4), the moving speed of the depositing tool (28) and the rotational speed of the cone holder (12) being selected such that the depositing tool (28) is intended to move along a single generatrix of the conical mould (22) so as to be able to deposit, around said conical mould (22), continuous and contiguous turns (30) of the preparation intended to become the pastry so as to obtain at least one cone (32) formed of continuous and contiguous turns (30) of said preparation formed around the conical mould (22).

3. The apparatus (1) as claimed in claim 1, wherein the plate (4) is a rotating plate, and wherein the means (26) for guiding the depositing tool (28) are arranged to assist said depositing tool (28) in moving along the conical mould (22) mounted on the cone holder (12) when said cone holder (12) is rotationally driven by the rotating plate (4), the moving speed of the depositing tool (28) and the rotational speed of the cone holder (12) being selected such that the depositing tool (28) is intended to move along different generatrixes of the conical mould (22) following the directrix, so as to be able to deposit, on said conical mould (22), contiguous lines following the generatrixes of the preparation intended to become the pastry so as to obtain at least one cone (32) formed of contiguous generatrix lines of said preparation formed around the conical mould (22).

4. The apparatus as claimed in claim 1, wherein the means (26) for guiding the tool (28) for depositing the preparation intended to become the pastry are arranged to assist the positioning of said depositing tool (28) in parallel with a generatrix of the conical mould (22) at least during the depositing of the preparation intended to become the pastry.

5. The apparatus as claimed in claim 1, wherein the guide means (26) comprise a bar (34) mounted so as to be pivotable with respect to the base (2).

6. The apparatus as claimed in claim 5, wherein the bar (34) has at least one guide edge (34b) able to receive at least one groove (46) provided on the tool (28) for depositing the preparation intended to become the pastry.

7. The apparatus as claimed in claim 5, wherein the bar (34) is provided with a runner (50) having a longitudinal opening (52) delimited by two mutually facing longitudinal guide edges (54a, 54b), each of said guide edges (54a, 54b) being able to receive a lateral groove (56a, 56b) provided on a guide carriage (58) arranged to carry the tool (28) for depositing the preparation intended to become the pastry.

8. The apparatus as claimed in claim 7, wherein the guide carriage (58) comprises a body having, between longitudinal main upper (58a) and lower (58b) faces, a through-going orifice (60), the main upper face (58a) being intended to receive the tool (28) for depositing the preparation intended to become the pastry, and the main lower face (58b) being intended to receive an end fitting (44) having an opening with a shape allowing a strand of said preparation to be delivered therefrom, said body of the guide carriage (58) having, on its two side faces (58c, 58d), said side grooves (56a, 56b), in which the guide edges (54a, 54b) of the runner (50) can slide.

9. The apparatus as claimed in claim 8, wherein the main upper (58a) and lower (58b) faces of the body of the guide carriage (58) have front and rear ends having a T-shaped cross-section defining front (62a, 62b) and rear (64a, 64b) upper glides arranged to slide on the upper face (50a) of the runner (50) and front (66a, 66b) and rear (68a, 68b) lower glides arranged to slide on the lower face (50b) of the runner (50).

10. The apparatus as claimed in claim 1, wherein the base (2) comprises a first support surface (2a) arranged to be placed on a frame when the cone holder (12) is placed on the rotating plate (4) and a second support surface (2b) which is inclined with respect to the first support surface (2a) and is arranged to be placed on said frame at least when the preparation intended to become the pastry is to be deposited on the conical mould (22), the angle (α) between the first and second support surfaces (2a, 2b) being selected such that the longitudinal axis of the conical mould (22) is not vertical at least when said preparation is deposited on said conical mould (22).

11. The apparatus as claimed in claim 1, wherein the rotating plate (4) has means for fixing and centring the cone holder (12).

12. The apparatus as claimed in claim 1, wherein the conical mould (22) is made from silicone.

13. The apparatus as claimed in claim 1, wherein the preparation intended to become the pastry is a meringue preparation.

14. The apparatus as claimed in claim 1, wherein the cone has a circular or polygonal directrix.

15. Equipment for making a pastry (48) in the shape of a cone from a preparation intended to become the pastry, comprising an apparatus (1) as claimed in claim 1, and a tool (28) for depositing said preparation intended to become the pastry comprising a reservoir (42) for said preparation, said depositing tool (28) being arranged to cooperate with the guide means (26) of the apparatus (1) and the cone holder (12) such that said depositing tool (28) and the conical mould (22) mounted on the cone holder (12) move with respect to each other so as to be able to deposit, on said conical mould (22), the preparation intended to become the pastry to obtain at least one cone (32) of said preparation formed around the conical mould (22).

* * * * *